United States Patent
Osaka et al.

(10) Patent No.: US 12,111,460 B2
(45) Date of Patent: Oct. 8, 2024

(54) LENS DRIVING DEVICE, CAMERA MODULE, AND CAMERA-MOUNTED APPARATUS

(71) Applicants: Tomohiko Osaka, Tokyo (JP); Ichiro Hayashi, Tokyo (JP); Atsushi Kikuchi, Tokyo (JP)

(72) Inventors: Tomohiko Osaka, Tokyo (JP); Ichiro Hayashi, Tokyo (JP); Atsushi Kikuchi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 399 days.

(21) Appl. No.: 17/595,524

(22) PCT Filed: May 22, 2020

(86) PCT No.: PCT/JP2020/020217
§ 371 (c)(1),
(2) Date: Nov. 18, 2021

(87) PCT Pub. No.: WO2020/235667
PCT Pub. Date: Nov. 26, 2020

(65) Prior Publication Data
US 2022/0206287 A1 Jun. 30, 2022

(30) Foreign Application Priority Data
May 22, 2019 (JP) .................................. 2019-096197

(51) Int. Cl.
*G02B 26/08* (2006.01)
*G02B 3/14* (2006.01)
(Continued)

(52) U.S. Cl.
CPC ........... *G02B 26/0875* (2013.01); *G02B 3/14* (2013.01); *G02B 26/004* (2013.01); *G03B 13/36* (2013.01);
(Continued)

(58) Field of Classification Search
CPC ................................ G02B 3/14; G02B 26/004
See application file for complete search history.

(56) References Cited

U.S. PATENT DOCUMENTS

| | | | |
|---|---|---|---|
| 2011/0122495 A1 | 5/2011 | Togashi | |
| 2016/0259094 A1 | 9/2016 | Aschwanden | |

(Continued)

FOREIGN PATENT DOCUMENTS

| | | |
|---|---|---|
| CN | 109597148 A | 4/2019 |
| JP | 2013-210550 A | 10/2013 |

(Continued)

OTHER PUBLICATIONS

International Search Report from International Application No. PCT/JP2020/020217 mailed Aug. 4, 2020.

*Primary Examiner* — Cara E Rakowski
(74) *Attorney, Agent, or Firm* — Shih IP Law Group, PLLC.

(57) ABSTRACT

This lens driving device is configured separately from a lens unit including a liquid lens, and is provided with: a fixed part; a movable part; a support part that supports the movable part with respect to the fixed part; a driving unit that is formed from a voice coil motor comprising a coil and a magnet and that moves the movable part in an optical axis direction with respect to the fixed part; and a lens deformation unit that is connected to the movable part and that applies, in association with the movement of the movable part, a force to the liquid lens in the optical axis direction. The movable part has a plurality of movable units, and the (Continued)

driving unit drives the movable units independently so as to change the curvature of the liquid lens or to change the optical axis of the liquid lens.

4 Claims, 13 Drawing Sheets

(51) Int. Cl.
    *G02B 26/00*     (2006.01)
    *G02B 27/64*     (2006.01)
    *G03B 13/36*     (2021.01)
    *G03B 30/00*     (2021.01)
    *H02K 41/035*     (2006.01)

(52) U.S. Cl.
    CPC ......... *G03B 30/00* (2021.01); *H02K 41/0356* (2013.01); *G02B 27/646* (2013.01); *G03B 2205/0007* (2013.01); *G03B 2205/0069* (2013.01)

(56) References Cited

U.S. PATENT DOCUMENTS

| | | |
|---|---|---|
| 2019/0129132 A1 | 5/2019 | Fan |
| 2019/0227199 A1 | 7/2019 | Kao |
| 2020/0209439 A1 | 7/2020 | Hu |
| 2020/0363565 A1* | 11/2020 | Aschwanden ....... G02B 27/646 |
| 2022/0187615 A1* | 6/2022 | Xia ..................... G02B 26/004 |

FOREIGN PATENT DOCUMENTS

| | | |
|---|---|---|
| JP | 2015-114615 A | 6/2015 |
| JP | 2017-003956 A | 1/2017 |
| JP | 6498188 B2 | 4/2019 |
| JP | 2019-139223 A | 8/2019 |
| JP | 2020-112793 A | 7/2020 |

* cited by examiner

LENS DRIVING DEVICE, CAMERA MODULE, AND CAMERA-MOUNTED APPARATUS

TECHNICAL FIELD

The present invention relates to a lens driving device for a liquid lens, a camera module, and a camera-mounted device.

BACKGROUND ART

A small-sized camera module is commonly mounted in a mobile terminal such as a smartphone. Such a camera module includes a lens driving device which has an automatic focusing (hereinafter, referred to as an "AF: auto focus") function to automatically perform focusing during imaging a subject, and a shake correction (or an optical image stabilization, hereinafter referred to as an "OIS") function to optically correct shake (vibration) generated during the imaging to reduce distortion of an image (see, for example, Patent Literature (hereinafter abbreviated as "PTL") 1).

The lens driving device disclosed in PTL 1 includes a driving part for automatic focusing (hereinafter referred to as "AF driving part") for moving a lens unit in the optical axis direction, and a driving part for shake correction (hereinafter referred to as "OIS driving part") for swaying the lens unit in a plane orthogonal to the optical axis direction. In PTL1, voice coil motors (VCMs) are used in the AF driving part and the OIS driving part.

In addition, PTL 2 discloses a lens device that deforms a liquid lens with a liquid sealed in a transparent container to change the focal length and optical axis of the liquid lens. For example, when a ring-shaped deforming member is uniformly pressed against the peripheral edge part of the liquid lens, the curvature of the liquid lens changes to change the focal length, and when the deforming member is pressed in an inclined manner, the optical axis changes. As a result, focusing and shake correction can be performed.

The lens device disclosed in PTL 2 uses the same lens driving part (actuator) to perform focusing and shake correction, which simplifies the driving structure compared to the method as in PTL 1 that moves the lens unit in the optical axis direction and the direction orthogonal the optical axis. The lens device disclosed in PTL 2 is thus suitable for downsizing and weight reduction.

CITATION LIST

Patent Literature

PTL 1
Japanese Patent Application Laid-Open No. 2013-210550
PTL 2
Japanese Patent No. 6498188

SUMMARY OF INVENTION

Technical Problem

In the lens device disclosed in PTL 2, a part of the lens driving part (for example, a coil or a magnet of a VCM) is incorporated in a lens unit including a liquid lens. Therefore, for downsizing, both the lens unit and the lens driving part need to be considered in the design, resulting in a low degree of freedom in design. In addition, upon occurrence of failures such as damage in the lens unit, the entire lens unit including the lens driving part must be repaired or replaced, which lacks versatility.

An object of the present invention is to provide a lens driving device, a camera module, and a camera-mounted device which have excellent versatility and are suitable for downsizing and weight reduction.

Solution to Problem

A lens driving device according to the present invention is configured separately from a lens unit including a liquid lens, and applies an external force to the liquid lens to change a focal length and an optical axis of the liquid lens. The lens driving device includes the following:
  a fixed part;
  a movable part disposed apart from the fixed part;
  a support part that supports the movable part with respect to the fixed part;
  a driving part including a voice coil motor that includes a coil and a magnet, the driving part being for moving the movable part with respect to the fixed part in a direction of the optical axis; and
  a lens deforming part connected to the movable part, the lens deforming part being for applying a force to the liquid lens in the direction of the optical axis in accordance with a movement of the movable part, in which
  the movable part includes a plurality of movable units,
  one of the coil or the magnet is disposed in each of the plurality of movable units,
  the other of the coil or the magnet is disposed at each of positions in the fixed part, the positions corresponding to the plurality of movable units, and the driving part drives the plurality of movable units independently in such a way that a curvature of the liquid lens changes or the optical axis of the liquid lens changes.

A camera module according to the present invention includes the following:
  the lens driving device described above;
  the lens unit; and
  an image capturing part that captures a subject image formed by the lens unit.

A camera-mounted device according to the present invention is an information device or a transporting device, and the camera-mounted device includes the following:
  the camera module described above; and
  an image processing part that processes image information obtained by the camera module.

Advantageous Effects of Invention

The present invention is capable of providing a lens driving device, a camera module, and a camera-mounted device which have excellent versatility and are suitable for downsizing and weight reduction.

DESCRIPTION OF EMBODIMENTS

Hereinafter, at least one embodiment of the present invention will be described in detail with reference to the accompanying drawings.

Figure 1A:
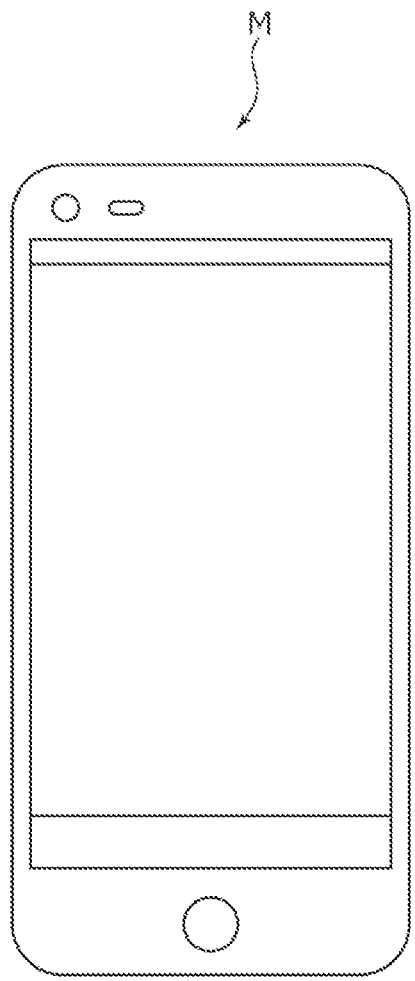
FIGS. 1A and 1B illustrate a smartphone equipped with a camera module according to an embodiment of the present invention.
Figure 1B:
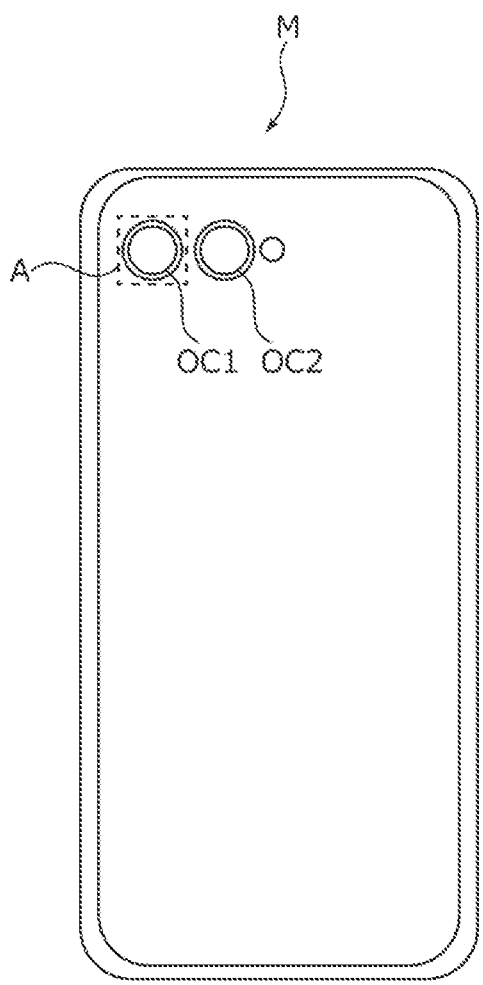

FIGS. 1A and 1B illustrate smartphone M (camera-mounted device) equipped with camera module A according to an embodiment of the present invention. FIG. 1A is a front view of smartphone M, and FIG. 1B is a rear view of smartphone M.

Camera module A is mounted on smartphone M as, for example, rear camera OC1 and/or OC2. Camera module A has an AF function and an OIS function to automatically perform focusing when a subject is to be imaged and to optically correct shake (vibration) generated during the imaging, thereby capturing an image with no image blur.

Figure 2:
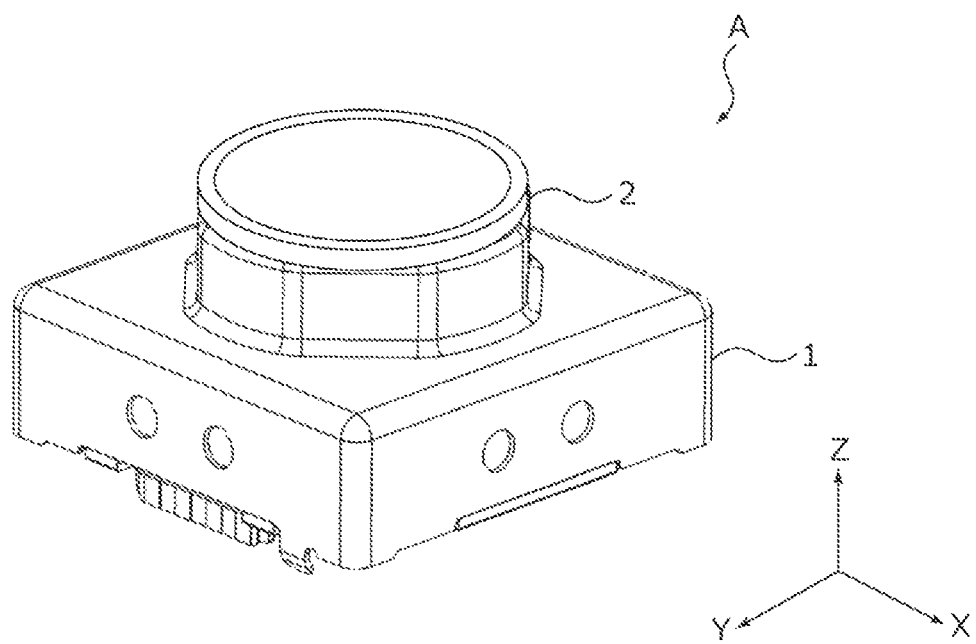
FIG. 2 is a perspective view of an external appearance of the camera module.
Figure 3:
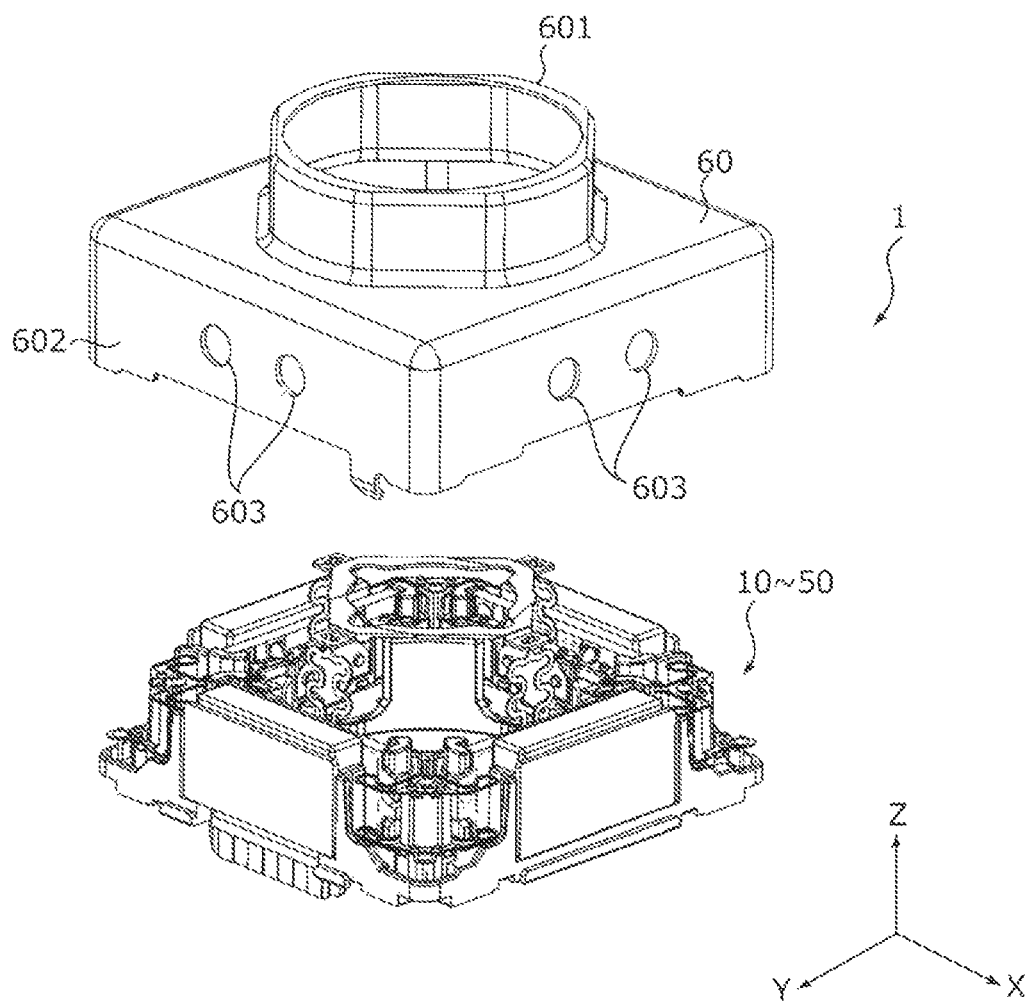
FIG. 3 is a perspective view of a lens driving device.

FIG. 2 is a perspective view of an external appearance of camera module A. FIG. 3 is a perspective view of lens driving device 1. FIG. 3 illustrate lens driving device 1 with cover 60 detached from main body parts 10 to 50. As illustrated in FIGS. 2 and 3, the description will be given in the present embodiment with an orthogonal coordinate system (X, Y, Z). The same orthogonal coordinate system (X, Y, Z) is used for the illustration in the drawings described below.

Camera module A is mounted in smartphone M in such a way that the X direction is a vertical direction (or a horizontal direction), the Y direction is a horizontal direction (or a vertical direction), and the Z direction is a front-rear direction when the imaging is actually performed with the use of smartphone M. That is, the Z direction is the optical axis direction, the upper side in the drawing is the light receiving side in the optical axis direction, and the lower side in the drawing is the image forming side in the optical axis direction. The X direction and the Y direction each orthogonal to the Z direction are referred to as "directions orthogonal to the optical axis, or optical-axis orthogonal directions." The XY plane is referred to as "optical-axis orthogonal plane."

As illustrated in FIGS. 2 and 3, camera module A includes lens driving device 1 that achieves the AF function and the OIS function, lens unit 2, an image capturing part (not illustrated) which captures a subject image formed by lens unit 2, and the like.

Lens driving device 1 is configured separately from lens unit 2, and applies an external force to liquid lens 71 (see, for example, FIG. 12A) of lens unit 2 to change the focal length or optical axis of the liquid lens for performing automatic focusing or shake correction.

Figure 12A:
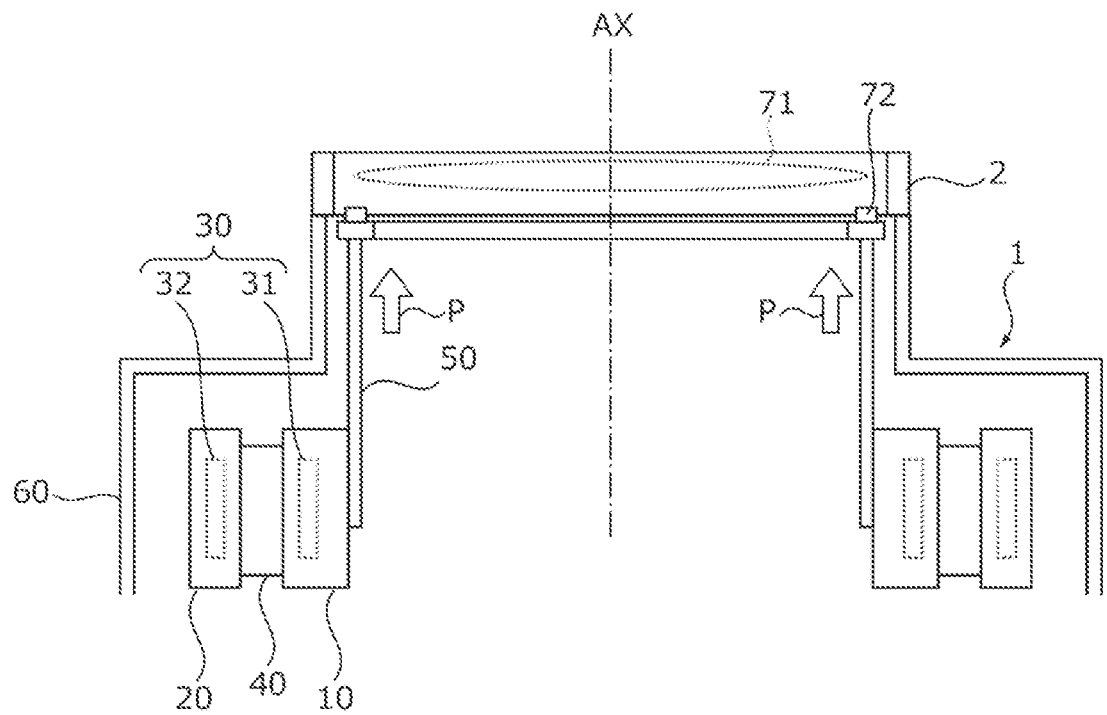
FIGS. 12A and 12B are schematic views illustrating an example of the operation of the lens driving device.

Lens unit 2 includes liquid lens 71 with a liquid sealed in a transparent container (see, for example, FIG. 12A). Liquid lens 71 is deformed by a force (compressive force or tensile force) in the optical axis direction, thereby changing the focal length and the optical axis thereof. Liquid lens 71 may be any lens that is deformed by an external force, and may be a gel-like lens. For example, ring-shaped lens support member 72 (see, for example, FIG. 12A) is bonded to the surface of liquid lens 71—the surface on the image forming side in the optical axis direction. The configuration of liquid lens 71 is known (see, for example, PTL 2), thus detailed description thereof will be omitted.

Cover 60 is a square cylinder with a cover having a rectangular (for example, square) shape in plan view in the optical axis direction. Cover 60 is, for example, in a shape of a two-stage aperture with the central portion thereof protrudes in a substantially cylindrical shape toward the light receiving side in the optical axis direction. Lens unit 2 is disposed on upper end surface 601 of cover 60. One or more adhesive injection ports 603 are provided on side surface 602 of cover 60. Cover 60 is disposed so as to cover main body parts 10 to 50, and is fixed by, for example, bonding side surface 602 of cover 60 and yoke 33 (see FIG. 6) with each other.

The image capturing part (not illustrated) is disposed in lens driving device 1 on the image forming side in the optical axis direction. The image capturing part (not illustrated) includes, for example, an image sensor board and an image capturing device mounted on the image sensor board. The image capturing device includes, for example, a charge-coupled device (CCD) image sensor or a complementary metal oxide semiconductor (CMOS) image sensor. The image capturing device captures a subject image formed by lens unit 2. Lens driving device 1 is mounted on the image sensor board (not illustrated) and is mechanically and electrically connected thereto. A control part that controls the drive of lens driving device 1 may be provided on the image sensor board, or in the camera-mounted device (smartphone M in the present embodiment) equipped with camera module A mounted thereon. The control signal from the control part controls the current flowing in coil 31.

Figure 4:
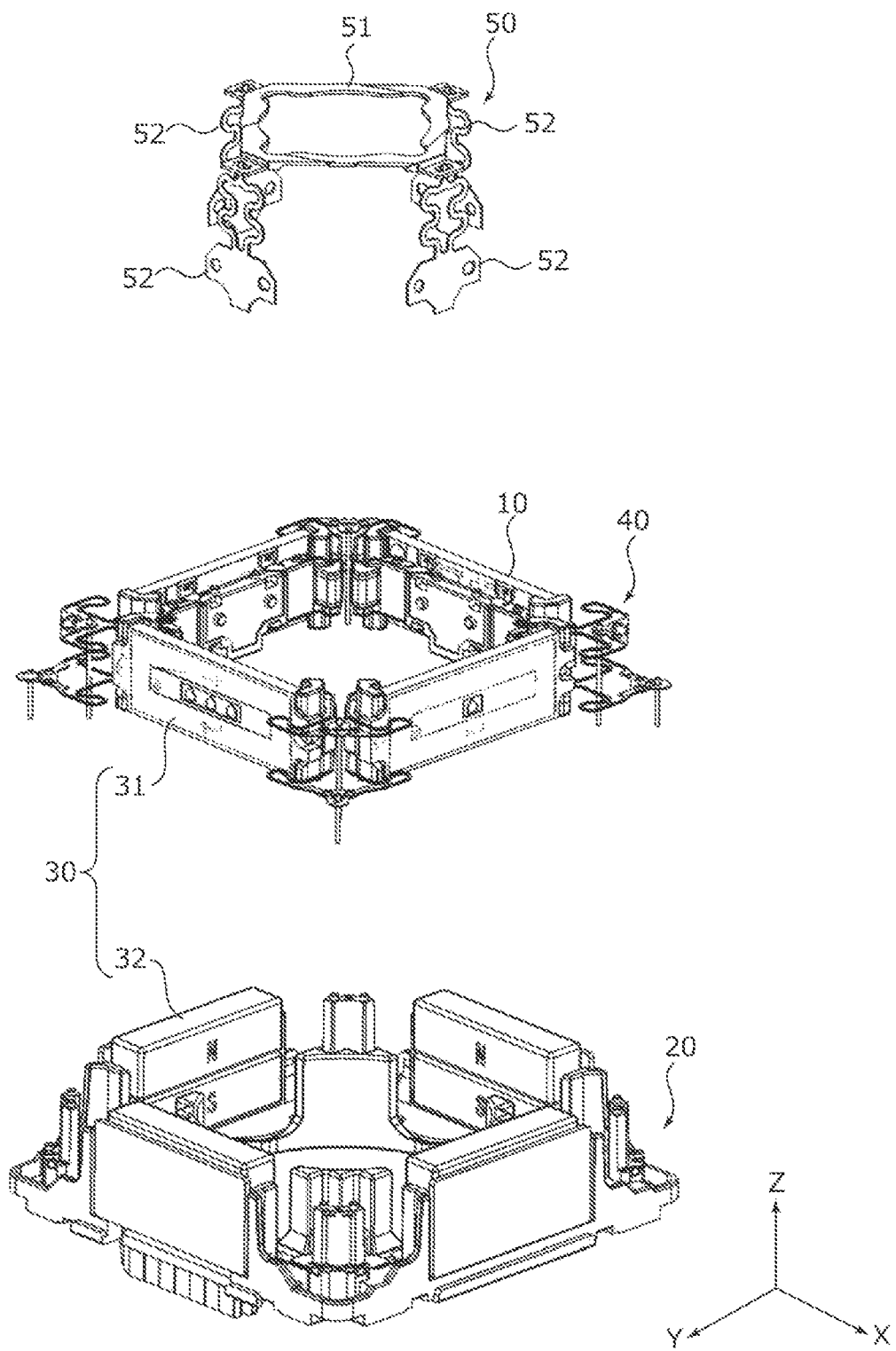
FIG. 4 is an exploded perspective view of a main body part of the lens driving device.
Figure 5:
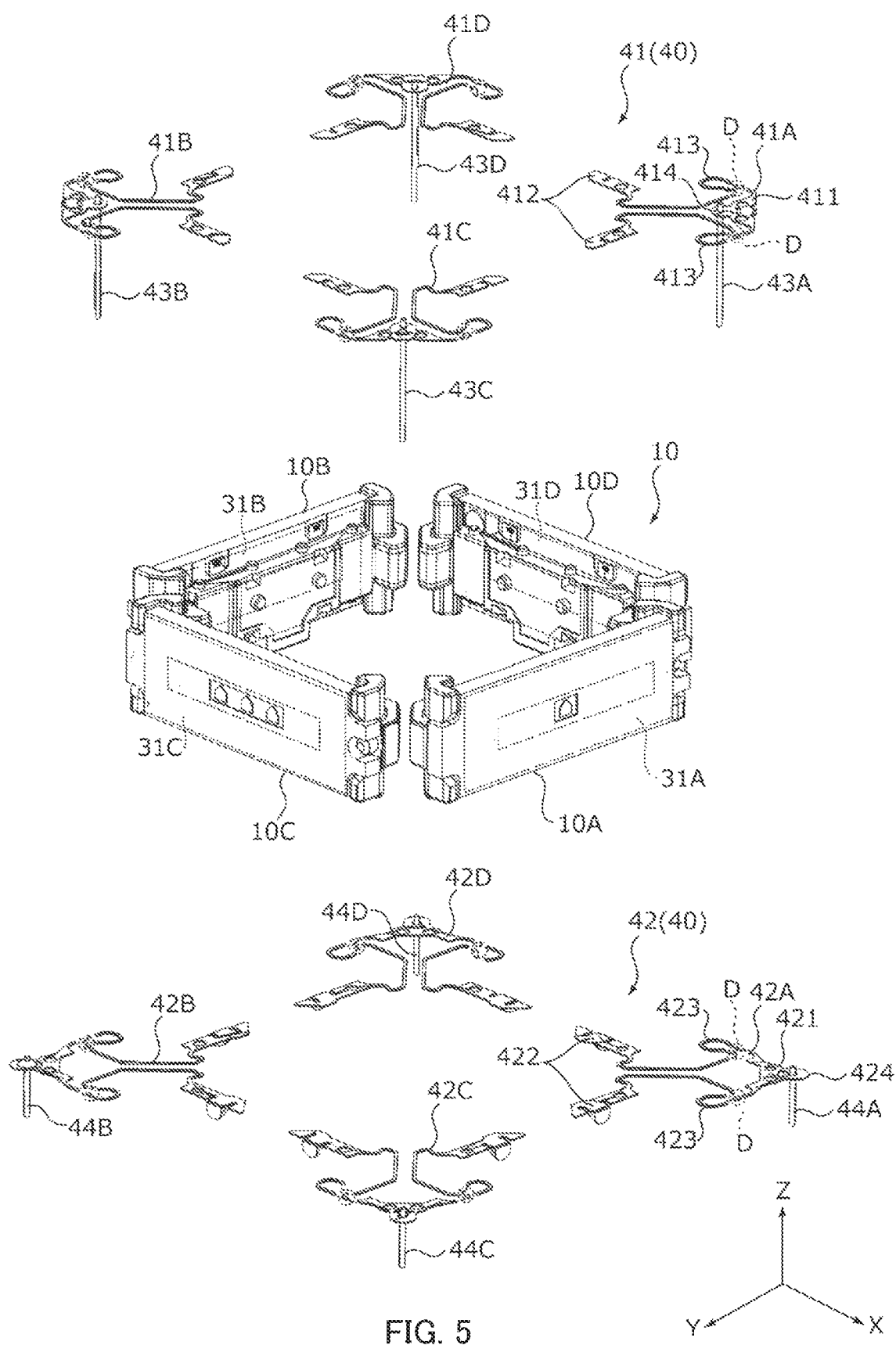
FIG. 5 is an exploded perspective view of the main body part of the lens driving device.
Figure 6:
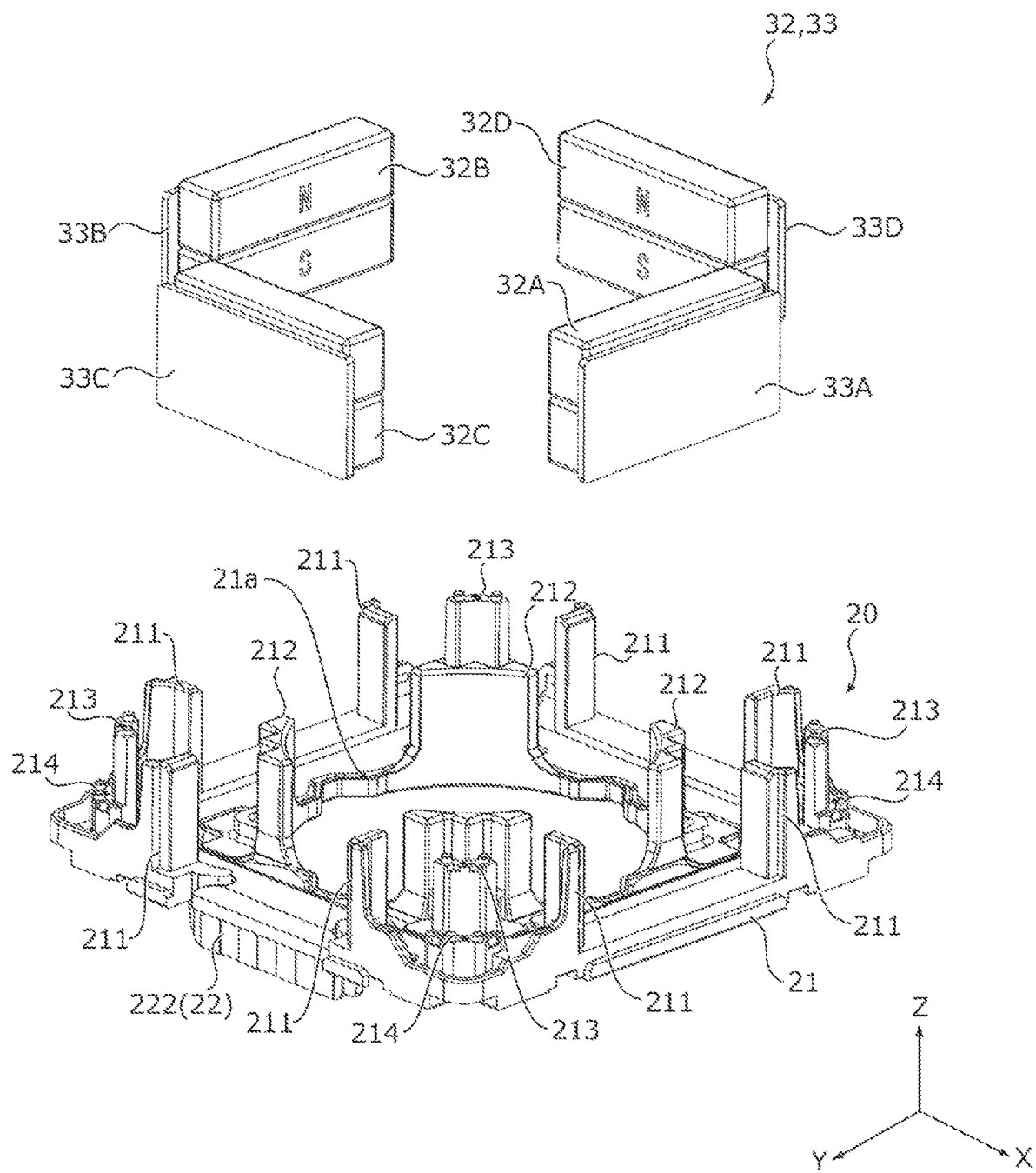
FIG. 6 is an exploded perspective view of the main body part of the lens driving device.
Figure 7:
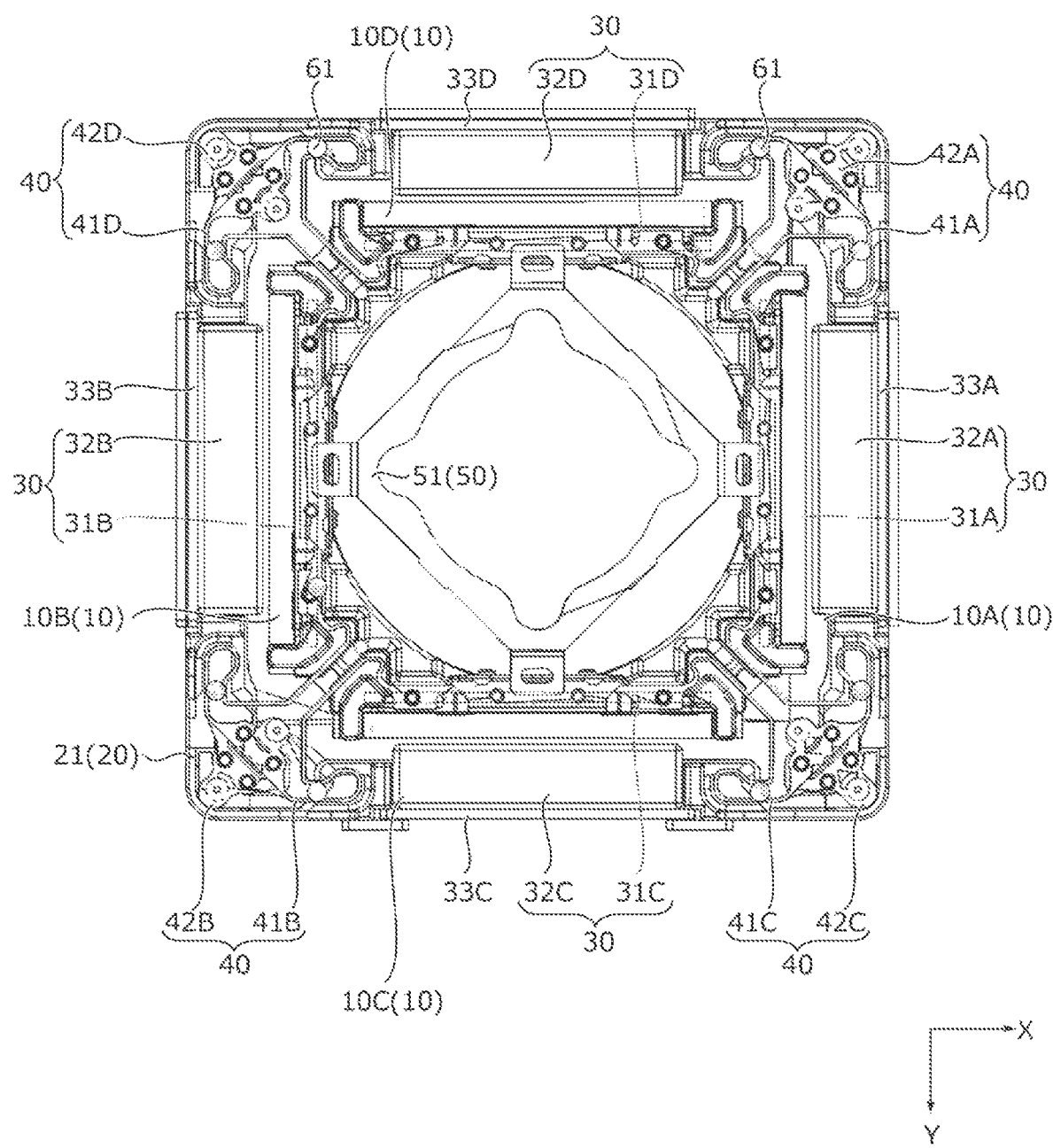
FIG. 7 is a plan view of the main body part of the lens driving device as viewed from the light receiving side in the optical axis direction.

FIGS. 4 to 6 are each an exploded perspective view of main body parts 10 to 50 of lens driving device 1. FIG. 5 illustrates the disassembled state of movable part 10 and support part 40 in FIG. 4. FIG. 6 illustrates the disassembled state of fixed part 20 in FIG. 4. FIG. 7 is a plan view of main body parts 10 to 50 of lens driving device 1 as viewed from the light receiving side in the optical axis direction.

As illustrated in FIGS. 4 to 7, lens driving device 1 includes movable part 10, fixed part 20, driving part 30, support part 40, lens deforming part 50, and the like in the present embodiment.

Movable part 10 is configured to move in the optical axis direction during automatic focusing and shake correction. Fixed part 20 is for supporting movable part 10 via support part 40. Movable part 10 is disposed to be radially spaced apart from fixed part 20 and is coupled with fixed part 20 by support part 40. Driving part 30 includes voice coil motors including coil 31 and magnet 32.

In the present embodiment, coil 31 is disposed in movable part 10, and magnet 32 is disposed in fixed part 20. That is, a moving coil method is employed in lens driving device 1. Compared to a moving magnet method, in which magnet 32 is disposed in movable part 10, the moving coil method reduces the weight of movable part 10 and increases the amount of the movement (hereinafter also referred to as "movement amount") of movable part 10 (increases the pressure applied to liquid lens 71) even when the driving force (Lorentz force generated in coil 31) is the same. As a result, power saving can be achieved.

Movable part 10 includes first to fourth coil units 10A to 10D (movable units) disposed so as to form a rectangular shape in plan view in the optical axis direction. Specifically, first and second coil units 10A and 10B are disposed so as to face each other in the X direction, and third and fourth coil units 10C and 10D are disposed so as to face each other in the Y direction.

Figure 8A:
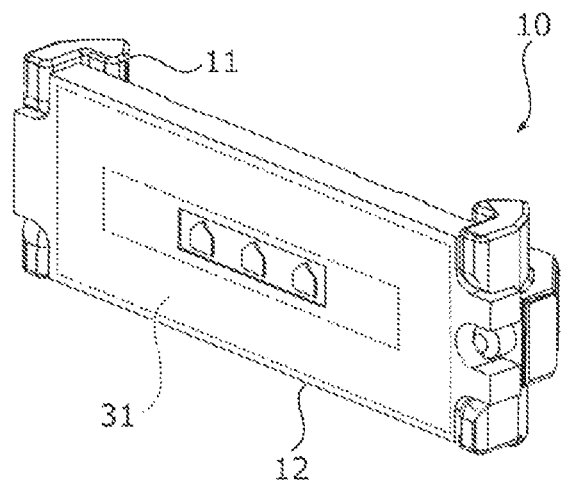
FIGS. 8A and 8B are perspective views of a coil unit.
Figure 8B:
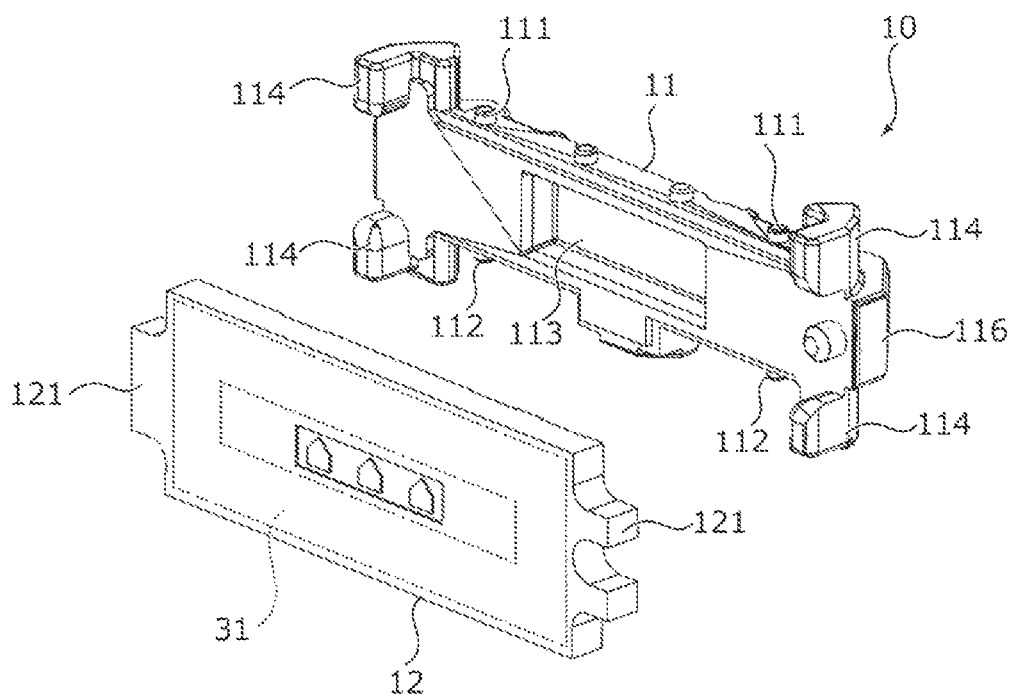
Figure 9A:
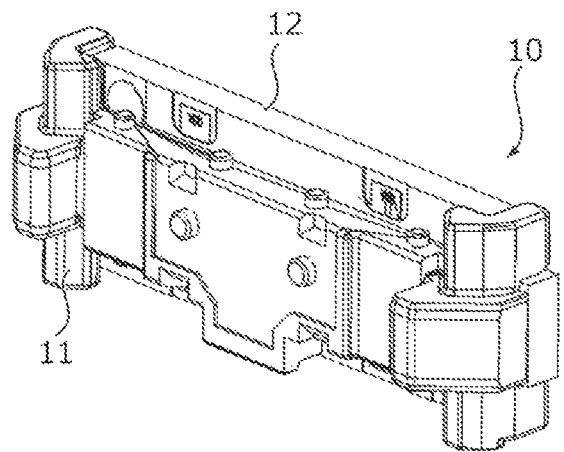
FIGS. 9A and 9B are perspective views of the coil unit.
Figure 9B:
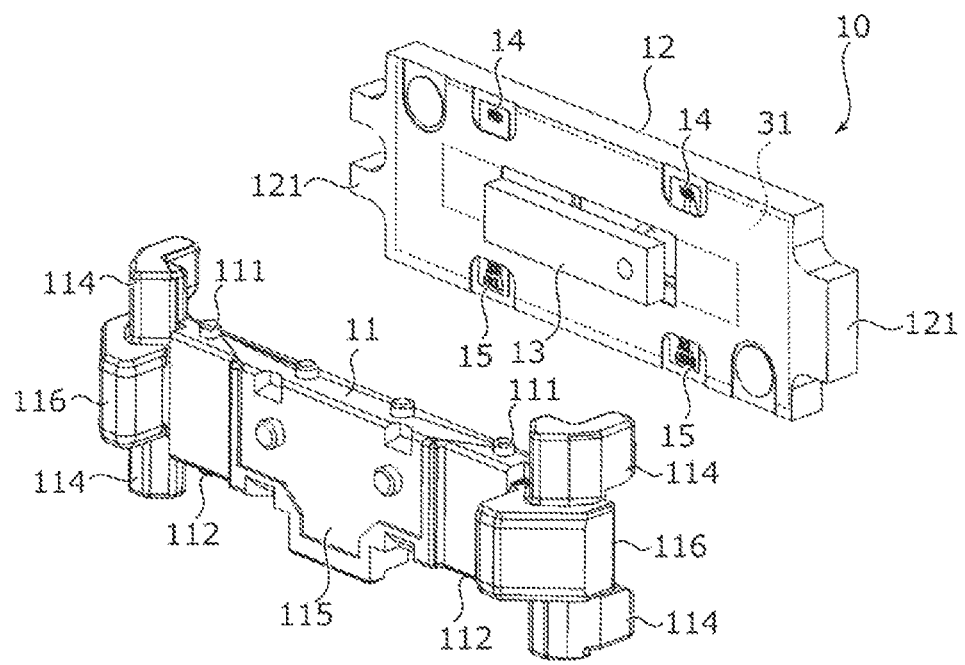

First to fourth coil units 10A to 10D each include coil board holder 11, coil board 12, and control Integrated Circuit (IC) 13 (see, for example, FIG. 8A). FIGS. 9A and 9B illustrate FIGS. 8A and 8B rotated by 180° about the Z-axis.

Coil board holder 11 is for holding coil board 12. Coil board holder 11 includes upper spring fixing part 111 for allowing upper elastic support member 41 to attach thereto, lower spring fixing part 112 for allowing lower elastic support member 42 to attach thereto, IC housing part 113 for housing control IC 13, board holding part 114 for holding coil board 12, coupling member fixing part 115 for allowing lens deforming part 50 to attach thereto, and base engaging part 116 for engaging with base 21.

Coil board 12 is a printed wiring board having a substantially rectangular shape, and includes, for example, a multilayer printed wiring board in which a plurality of unit layers composed of a conductor layer and an insulation layer (not illustrated) are stacked. Coil board 12 includes coil 31, power supply terminals 14, signal terminals 15, and wiring (not illustrated). Control IC 13 is mounted on coil board 12.

In the present embodiment, a conductor pattern including coil 31, power supply terminals 14, signal terminals 15, and wiring is integrally built into coil board 12. The wiring includes a power feed line connecting power supply terminals 14 with control IC 13, and signal line connecting signal terminals 15 with control IC 13. Power supply terminal 14 is soldered to upper elastic support member 41 and physically and electrically connected thereto. Signal supply terminal 15 is soldered to lower elastic support member 42 and physically and electrically connected thereto. Coil board 12 is, for example, fitted into coil board holder 11 in such a way that both ends 121 in the longitudinal direction of coil board 12 are engaged with board holding parts 114 and fixed by adhesion. Control IC 13 is housed in IC housing part 113 of coil board holder 11.

Control IC 13 include a built-in Hall element (not illustrated) which detects a change in the magnetic field by utilizing the Hall effect. When coil units 10A to 10D move in the optical axis direction, the magnetic fields generated by magnets 32A to 32D change. Detection of these changes in the magnetic fields by the Hall elements allows the detection of the positions of coil units 10A to 10D in the optical axis direction. Hall output proportional to the movement amount of each of coil units 10A to 10D can be obtained by designing the layout of the Hall elements and magnets 32A to 32D in such a way that the magnetic flux proportional to the movement amount of each of coil units 10A to 10D intersects the detection surface of the Hall element. In addition to magnets 32A to 32D, a magnet for detecting a position may be disposed on fixed part 20.

Control IC 13 controls the current flowing in the corresponding coil 31A, B, C, or D based on the detection results (Hall output) by the built-in Hall element and the control signal received via upper elastic support member 41.

Alternatively, power supply terminal 14 may be connected to lower elastic support member 42, and signal terminal 15 may be connected to upper elastic support member 41.

Hereinafter, for distinguishing coils 31 disposed in coil boards 12 of first to fourth coil units 10A to 10D, coils 31 are referred to as "coils 31A to 31D." In addition, magnets 32 and yokes 33 corresponding to coils 31A to 31D are referred to as "magnets 32A to 32D" and "yokes 33A to 33D."

Driving part 30 includes coils 31, magnets 32, and yokes 33.

Coil 31 is an air-core coil that is energized during automatic focusing and shake correction, and is formed in coil board 12. Coil 31 is formed in a flat shape in such a way, for example, that the coil plane is parallel to the optical axis, that is, the XZ or YZ plane is the coil plane. Both ends of coil 31 are connected to power supply terminals 14 of control IC 13, respectively.

Magnet 32 is attached to magnet fixing part 211 of base 21 in such a way that magnet is radially spaced apart from coil 31, and is fixed by, for example, adhesion. Magnet 32 is magnetized in the optical axis direction and is disposed in such a way that the magnetic fluxes cross the two long sides of coil 31 in opposite directions. As a result, when coil 31 is energized, the Lorentz forces in the same direction along the optical axis are generated on the two long sides. In the present embodiment, a voice coil motor includes coil 31 and magnet 32 as described above.

Yoke 33 is formed of a magnetic material such as an SPC material, and is fixed to the outside of magnet 32 in the radial direction, for example, by adhesion. In the magnetic circuit formed by yoke 33 and magnet 32, the magnetic flux efficiently intersects coil 31, thereby improving the driving efficiency.

Support part 40 includes upper elastic support member 41 (first elastic support members) for supporting movable section 10 against fixed part 20 on the light receiving side in the optical axis direction (upper side), and lower elastic support member 42 (second elastic support member) for supporting movable part 10 on the image forming side in the optical axis direction (lower side). Upper elastic support member 41 and lower elastic support member 42 are made of, for example, titanium copper, nickel copper, or stainless steel.

Upper elastic support member 41 includes upper springs 41A to 41D having the same structure.

Upper springs 41A to 41D are disposed at the upper portions of coil units 10A to 10D and base 21 so as not to come into contact with each other. Upper springs 41A to 41D are each formed, for example, by etching a single sheet metal.

Upper springs 41A to 41D each include base fixed part 411 to be fixed to base 21, holder fixed parts 412 to be fixed to coil board holders 11, and arm parts 413 coupling base fixed part 411 and holder fixed parts 412. Two arm parts 413 extend from base fixed part 411, and holder fixed parts 412 are disposed at the other ends of arm parts 413. Arm part 413 is formed to have a curved shape, and elastically deforms when movable part 10 moves in the optical axis direction.

In addition, upper springs 41A to 41D include jumper wire connection parts 414 to be connected to jumper wires 43A to 43D, respectively. Jumper wire connection part 414 is disposed so as to extend radially inward from base fixed part 411. Upper springs 41A to 41D function as power feed lines together with corresponding jumper wires 43A to 43D.

Lower elastic support member 42 has the same configuration as upper elastic support member 41. That is, lower elastic support member 42 includes lower springs 42A to 42D having the same structure.

Lower springs 42A to 42D are disposed at the lower portions of coil units 10A to 10D and base 21 so as not to come into contact with each other. Lower springs 42A to 42D are each formed, for example, by etching a single sheet metal.

Lower springs 42A to 42D each include base fixed part 421 to be fixed to base 21, holder fixed parts 422 to be fixed to coil board holders 11, and arm parts 423 coupling base fixed part 421 and holder fixed parts 422. Two arm parts 423 extend from base fixed part 421, and holder fixed parts 422 are disposed at the other ends of arm parts 423. Arm part 423 is formed to have a curved shape, and elastically deforms when movable part 10 moves in the optical axis direction.

In addition, lower springs 42A to 42D include jumper wire connection parts 424 to be connected to jumper wires 44A to 44D, respectively. Jumper wire connection part 424 is disposed so as to extend radially inward from base fixed part 421. Lower springs 42A to 42D function as signal lines together with corresponding jumper wires 44A to 44D.

Damper materials 61 (see FIG. 7) are disposed on arm parts 413 of upper springs 41A to 41D and arm parts 423 of lower springs 42A to 42D as appropriate. For example, in each of arm parts 413 and 423, damper material 61 is disposed on the portion where the arm is folded over to be adjacent (portion D surrounded by the broken line in FIG. 5). Disposing damper material 61 prevents the generation of unnecessary resonance (higher-order resonance mode), thereby increasing the stability of operation. Damper material 61 can be easily applied by using, for example, a dispenser. An ultraviolet curable silicone gel, for example, may be used as damper material 61.

Lens deforming part 50 includes lens contact member 51 and coupling members 52.

Lens contact member 51 has, for example, a rectangular ring shape and contacts liquid lens 71. In the present embodiment, lens contact member 51 is fixed by adhesion to lens support member 72 and indirectly contacts liquid lens 71. Coupling members 52 are provided so as to correspond to coil units 10A to 10D, and couple lens contact member 51 with coil units 10A to 10D (coil board holders 11). For example, one end of coupling member 52 is fixed to one of the four corners of lens contact member 51 and the other end is fixed to coupling member fixing part 115 of coil board holder 11.

Lens contact member 51, for example, presses liquid lens 71 uniformly or in an inclined manner in accordance with the movements of coil units 10A to 10D toward the light receiving side in the optical axis direction. The posture of lens contact member 51 is adjusted by the movement amounts of coil units 10A to 10D. Specifically, for automatic focusing, the movements of coil units 10A to 10D are controlled to have the same amount, and thus lens contact member 51 presses liquid lens 71 uniformly, thereby changing the focal length to perform automatic focusing. For shake correction, the movements of coil units 10A to 10D are controlled to have different amounts, and thus lens contact member 51 presses liquid lens 71 in an inclined manner, thereby inclining the optical axis of liquid lens 71 to perform shake correction.

Each of the four coupling members 52 is formed in zigzag shapes that are symmetrical with respect to the optical axis direction. This configuration maintains the parallelism (tilt characteristic) of lens contact member 51 to liquid lens 71, namely the contacting state of lens contact member 51 to liquid lens 71 because the twisting of lens contact member 51 is absorbed even when the movement amounts of coil units 10A to 10D are different from each other during shake correction.

The shape of lens contact member 51 may be any shape when lens contact member 51 can press liquid lens 71 uniformly or in an inclined manner, and the shape may also be, for example, a circular ring shape. The shape of coupling member 52 may be any shape when coupling member 52 can absorb the twisting of lens contact member 51 during shake correction.

Fixed part 20 includes base 21 and base board 22.

Base 21 is a member having a rectangular shape in plan view, and includes opening 21a in a region corresponding to liquid lens 71. In addition, base 21 includes magnet fixing parts 211, coil unit holding parts 212, upper spring fixing parts 213, and lower spring fixing parts 214. These parts are formed so as to protrude from the base surface toward the light receiving side in the optical axis direction, and function as ribs for reinforcing base 21.

Two magnet fixing parts 211 are provided on each of two sides—along the X direction—of the peripheral edge part of the base, and each of two sides—along the Y direction—of the peripheral edge part of the base. Magnet 32 and yoke 33 are fixed between the two magnet fixing parts.

Coil unit holding parts 212 are provided at four locations on the peripheral edge part of opening 21a, and coil units 10A to 10D are independently disposed between two adjacent coil unit holding parts 212 so as to be movable in the optical axis direction.

Upper spring fixing parts 213 are provided at the four corners of the base, and base fixed parts 411 of upper elastic support member 41 are fixed to the upper spring fixing parts.

Lower spring fixing parts 214 are provided at the four corners of the base, and base fixed parts 421 of lower elastic support member 42 are fixed to the lower spring fixing parts. In the present embodiment, upper spring fixing part 213 and lower spring fixing part 214 are integrally formed.

Figure 10:
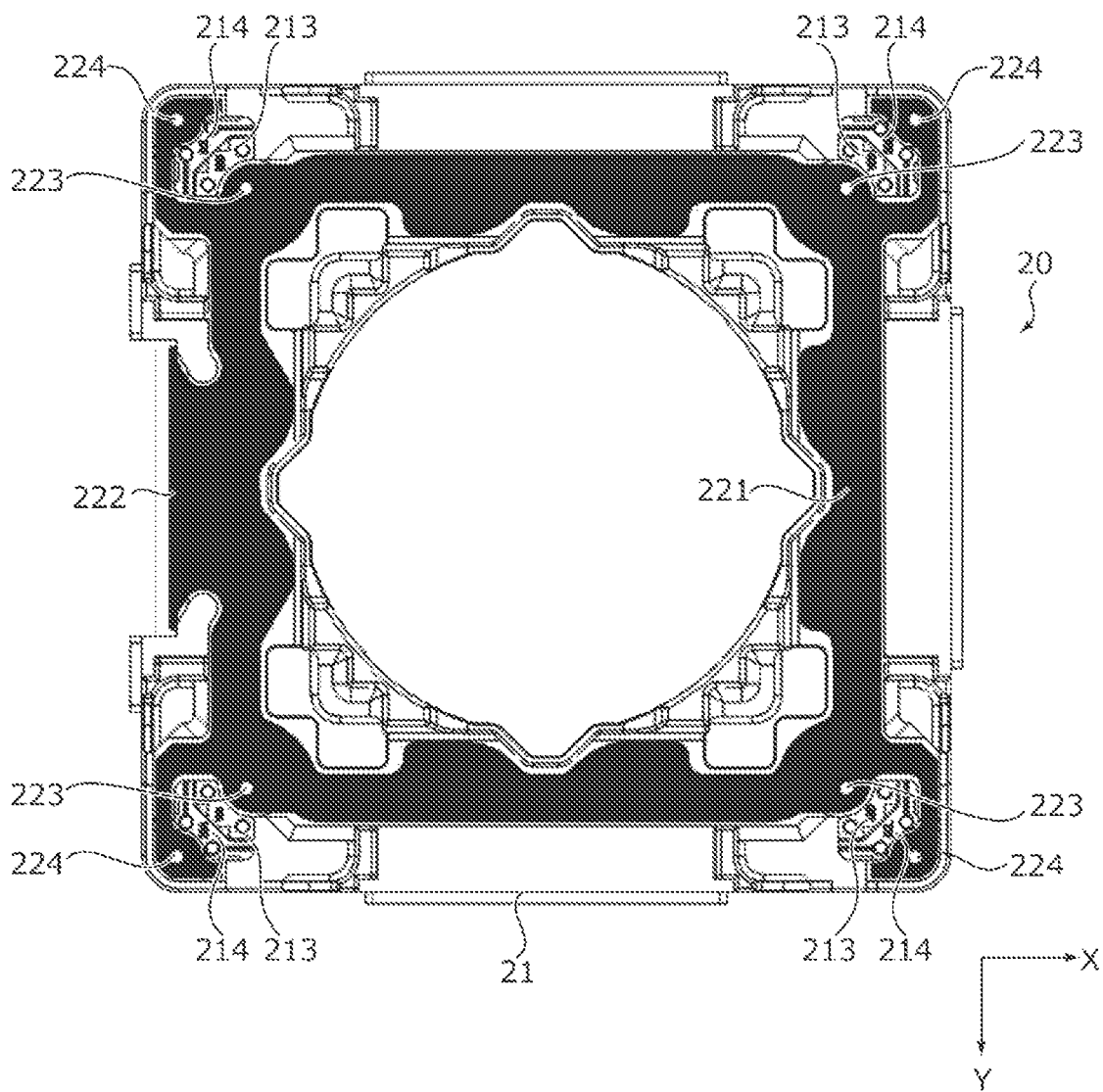
FIG. 10 is a plan view illustrating the arrangement of a base board.

Base board 22 is a printed wiring board including main board part 221, external terminal part 222, upper spring connection parts 223, lower spring connection parts 224, and wiring (not illustrated) (see FIG. 10). Main board part 221 is formed so as to cover substantially the entire surface of base 21. External terminal part 222 extends from one side of main board part 221 and is bent along one side surface of base 21. Upper spring connection part 223 is disposed to be located on the inner side relative to upper spring fixing part 213 in base 21. Lower spring connection 224 is disposed in such a way that lower spring connection 224 extends around upper spring fixing section 213 and lower spring fixing section 214 of base 21 to one of the corners of base 21 to be located on the outer side relative to lower spring fixing section 214 in base 21. The wiring includes power feed lines and signal lines from external terminal part 222. The conductor patterns of power feed lines are exposed from upper spring connection parts 223 and electrically connected to upper springs 41A to 41D via jumper wires 43A to 43D. The conductor patterns of signal lines are exposed from lower spring connection parts 224 and electrically connected to lower springs 42A to 42D via jumper wires 44A to 44D. Wiring and the like may be integrally formed in base 21 by insert molding.

Figure 11:
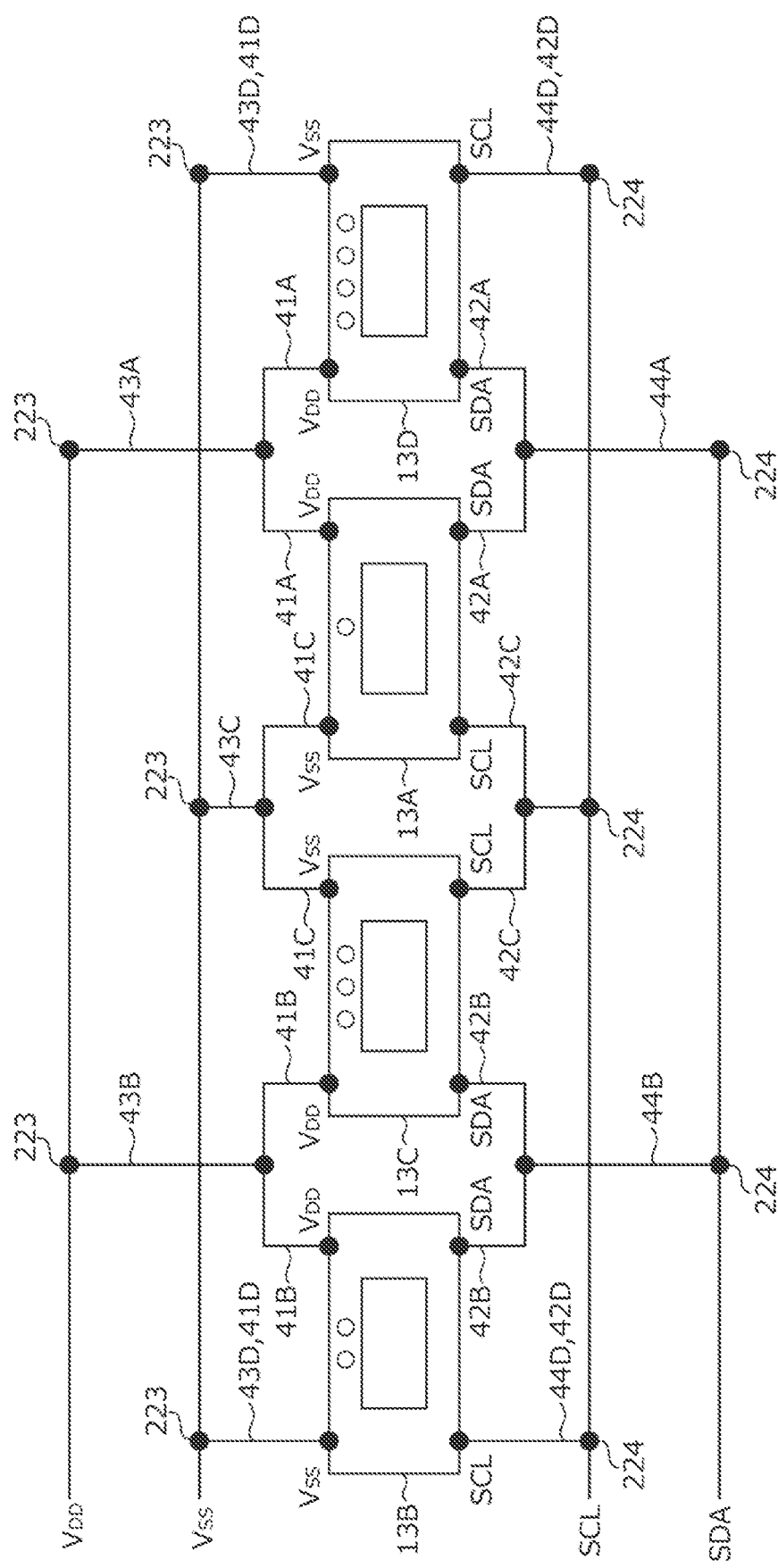
FIG. 11 is a wiring diagram illustrating power feed lines and wiring lines from the base board to control ICs.

FIG. 11 is a wiring diagram illustrating an example of power feed lines and wiring lines from base board 22 (the driving part that performs drive control) to control IC 13. In the present embodiment, Inter-Integrated Circuit (I2C) communication is used for the communication between control IC 13 and the control part.

As illustrated in FIG. 11, in lens driving device 1, power supply terminal VDD (positive power supply) of base board 22 is connected to power supply terminals VDD of control ICs 13A and 13D (control ICs 13 of coil units 10A and 10D) via jumper wire 43A and upper spring 41A, and connected to power supply terminals VDD of control ICs 13B and 13C (control ICs 13 of coil units 10B and 10C) via jumper wire 43B and upper spring 41B.

Power supply terminal VSS (negative power supply) of base board 22 is connected to power supply terminals VSS of control ICs 13A and 13C via jumper wire 43C and upper spring 41C, and connected to power supply terminals VSS of control ICs 13B and 13D via jumper wire 43D and upper spring 41D.

Signal terminal SDA (data signal) of base board 22 is connected to signal terminals SDA of control ICs 13A and 13D via jumper wire 44A and lower spring 42A, and connected to signal terminals SDA of control ICs 13B and 13C via jumper wire 44B and lower spring 42B.

Signal terminal SCL (clock signal) of base board 22 is connected to signal terminals SCL of control ICs 13A and 13C via jumper wire 44C and lower spring 42C, and connected to signal terminals SCL of control ICs 13B and 13D via jumper wire 44D and lower spring 42D.

As described above, upper elastic support member 41 (first elastic support member) connects power supply terminals VDD to each other and power supply terminals VSS to each other for adjacent coil units among coil units 10A to 10D (movable units). The lower elastic support member 42 (second elastic support member) connects the signal terminals SDA to each other and the signal terminals SCL to each other for adjacent coil units among coil units 10A to 10D (movable units).

In addition, upper elastic support member 41 and lower elastic support member 42 are electrically connected to the wiring of base board 22 by jumper wires 43A to 43D and 44A to 44D extending from fixed part 20 (base board 22) toward the light receiving side in the optical axis direction.

Figure 12B:
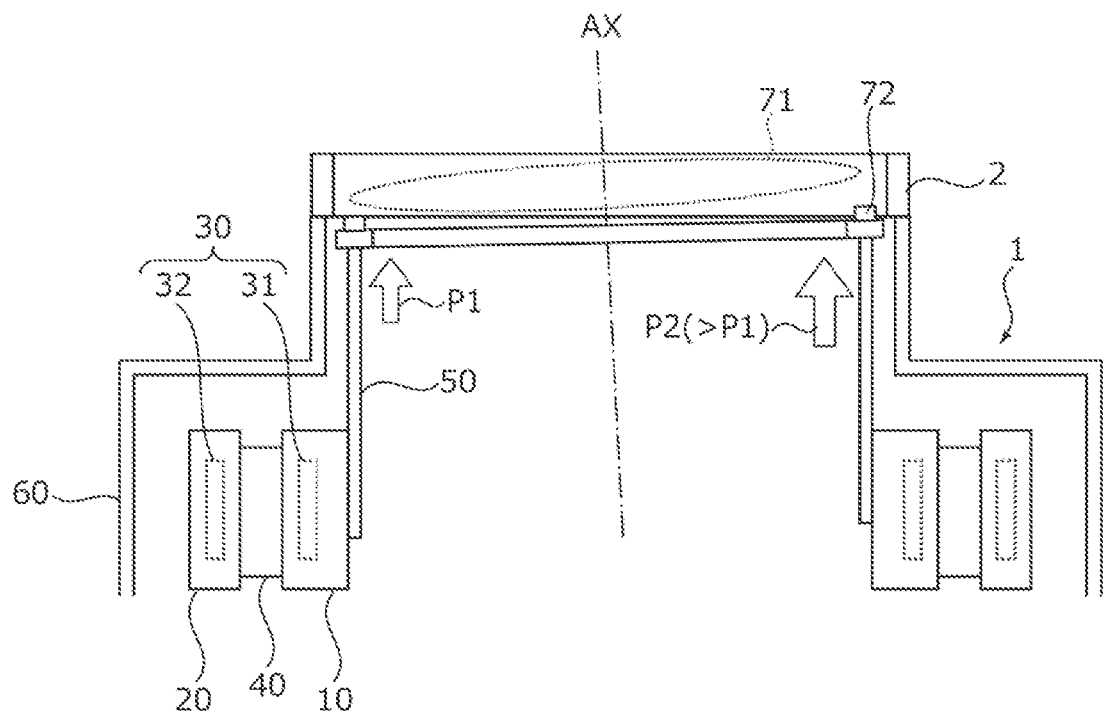

FIGS. 12A and 12B are schematic views illustrating an example of the operation of the lens driving device. FIG. 12A illustrates the state when automatic focusing is performed, and FIG. 12b illustrates the state when shake correction is performed.

For performing automatic focusing and shake correction in lens driving device 1, coils 31 disposed in coil units 10A to 10D are energized. When coil 31 is energized, a Lorentz force is generated in coil 31 due to the interaction between the magnetic field of magnet 32 and the current flowing in coil 31. The direction of the Lorentz force (herein, Z direction) is orthogonal to the direction of the magnetic field and the direction of the current flowing in coil 31. Magnet 32 is fixed, thus a reaction force acts on coil 31. This reaction force serves as the driving force of the voice coil motor, and moves coil units 10A to 10D, each including coil 31 disposed therein, in the optical axis direction.

In the present embodiment, currents flowing in coils 31A to 31D disposed in coil units 10A to 10D can be controlled independently by corresponding control ICs 13A to 13D. For automatic focusing, currents flowing in coils 31A to 31D are controlled to have the same value. For example, when coil units 10A to 10D move toward the light receiving side in the optical axis direction with the same behavior, lens deforming part 50 is pressed uniformly against liquid lens 71 (for example, pressure P). As a result, the curvature (lens thickness) of liquid lens 71 changes uniformly, and the focal length thereof changes (see FIG. 12A). Controlling the currents flowing in coils 31A to 31D can adjust the movement amount of lens deforming section 50, thereby performing the focusing.

For shake correction, currents flowing in coils 31A to 31D are controlled to have different values. For example, when coil units 10A to 10D move toward the light receiving side in the optical axis direction with different behaviors, lens deforming part 50 is pressed against liquid lens 71 in an inclined manner (for example, pressure P1 and P2 (>P1)). As a result, optical axis AX of liquid lens 71 changes (see FIG. 12B). Controlling the currents flowing in coils 31A to 31D can adjust the posture of lens deforming section 50, thereby performing the shake correction.

The focal length or optical axis of liquid lens 71 may be adjusted by pulling liquid lens 71 uniformly or in an inclined manner with the use of lens contact member 51 in accordance with the movements of coil units 10A to 10D toward the image forming side in the optical axis direction. For shake correction, coil units 10A and 10B facing each other, or coil units 10C and 10D facing each other may be moved in opposite directions to each other.

As described above, lens driving device 1 is configured separately from lens unit 2 including liquid lens 71, and applies an external force to liquid lens 71 to change the focal length and the optical axis of liquid lens 71. Lens driving device 1 includes the following: fixed part 20; movable part 10 to be disposed apart from fixed part 20; support part 40 for supporting movable part 10 with respect to fixed part 20; driving part 30 which includes a voice coil motor including coil 31 and magnet 32 and which is for moving movable part 10 with respect to fixed part 20 in the optical axis direction; and lens deforming part 50 which is configured to be connected to movable part 10 and which is for applying a force (compressive force or tensile force) to liquid lens 71 in the optical axis direction in accordance with the movement of movable part 10. Movable part 10 includes a plurality of coil units 10A to 10D (movable units). Coils 31 are disposed in the plurality of coil units 10A to 10D, and magnets 32 are disposed in fixed part 20 at the positions corresponding to coil units 10A to 10D. Driving part 30 drives the plurality of coil units 10A to 10D independently in such a way that the curvature of the liquid lens changes or the optical axis of the liquid lens changes.

Lens driving device 1 is configured separately from lens unit 2, thus has excellent versatility. In addition, a shared driving part is used for automatic focusing and shake correction in lens driving device 1, thereby allowing for downsizing and weight reduction.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, coils 31 are disposed in movable part 10 (coil units 10A to 10D), and magnets 32 are disposed in fixed part 20 (base 21) in the embodiment; however, magnets 32 may be disposed in movable part 10 and coils 31 may be disposed in fixed part 20.

In addition, upper elastic support member 41 and lower elastic support member 42 are electrically connected to base board 22 via jumper wires 43A to 43D and 44A to 44D in the embodiment; however, wiring (not illustrated) may be three-dimensionally formed on base 21 by, for example, insert molding, allowing upper elastic support member 41 and lower elastic support member 42 to be directly connected to the wiring.

While smartphone M serving as a camera-equipped mobile terminal has been described in the embodiment as an example of the camera-mounted device including camera module A, the present invention is applicable to a camera-mounted device including a camera module and an image processing part that processes image information obtained by the camera module. Examples of such a camera-mounted device include information devices and transporting devices. Examples of the information devices include camera-equipped mobile phones, laptop computers, tablet terminals, mobile game machines, web cameras, and in-vehicle devices with cameras (for example, rear-view monitor devices and drive recorder devices). Examples of the transporting devices include automobiles.

Figure 13A:
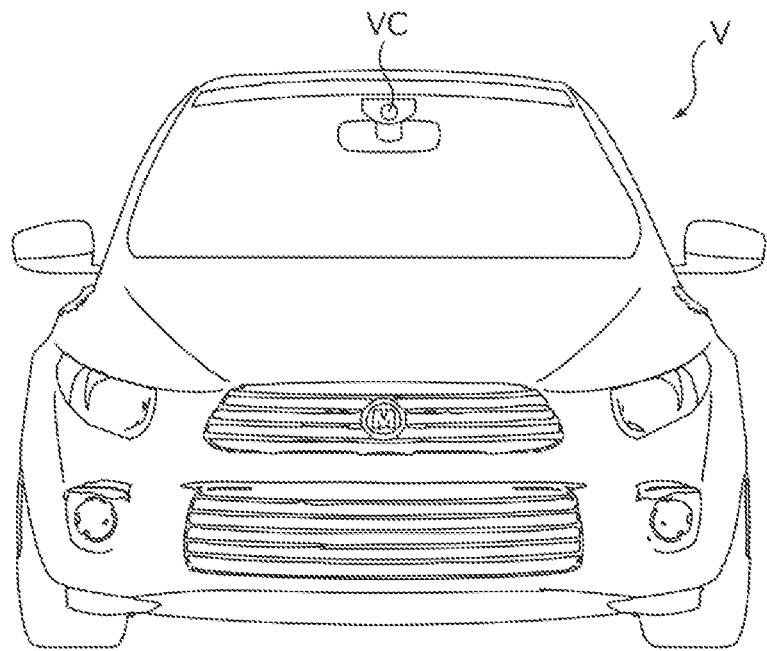
FIGS. 13A and 13B illustrate an automobile as a camera-mounted device equipped with an in-vehicle camera module.
Figure 13B:
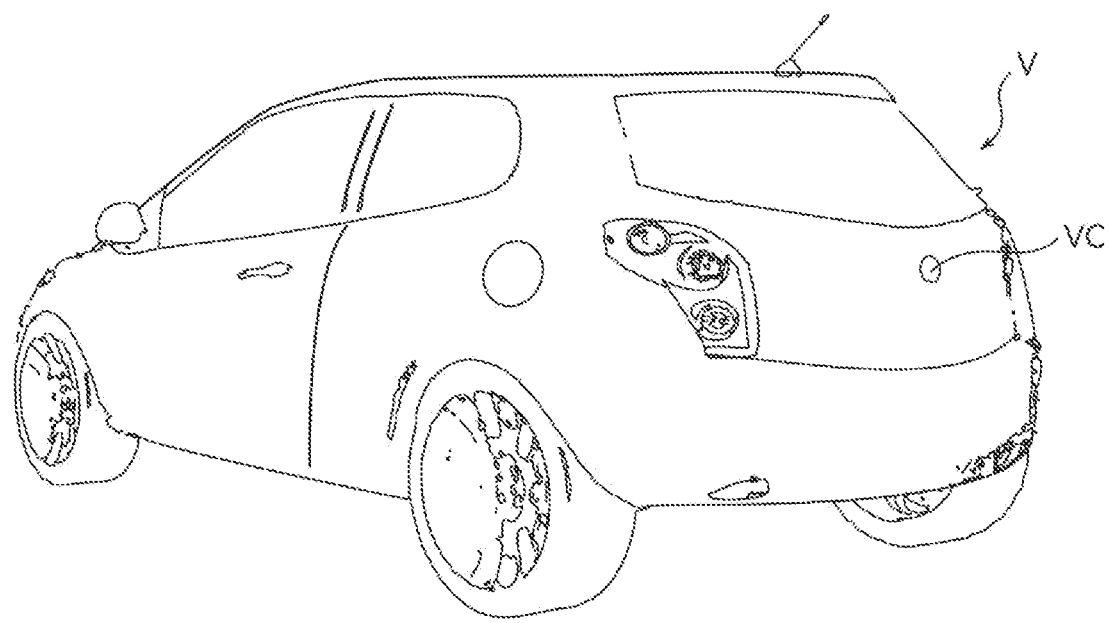

FIGS. 13A and 13B illustrate automobile V serving as the camera-mounted device equipped with in-vehicle camera module VC (i.e., vehicle camera). FIG. 13A is a front view of automobile V, and FIG. 13B is a rear perspective view of automobile V. Camera module A described in the embodiment is mounted in automobile V as in-vehicle camera module VC. As illustrated in FIGS. 13A and 13B, in-vehicle camera module VC is attached to, for example, a windshield to face forward or is attached to a rear gate to face backward. In-vehicle camera module VC is used for rear-view monitoring, drive recording, collision avoidance control, automatic drive control, and the like.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

This application is entitled to and claims the benefit of Japanese Patent Application No. 2019-096197 filed on May 22, 2019, the disclosure of which including the specification, drawings and abstract is incorporated herein by reference in its entirety.

REFERENCE SIGNS LIST

1 Lens driving device
2 Lens unit
10 Movable part
10A to 10D Coil unit (movable unit)
11 Coil board holder
12 Coil board
13 Control IC
20 Fixed part
21 Base
22 Base board
30 Driving part
31, 31A to 31D Coil
32, 32A to 32D Magnet
33, 33A to 33D Yoke
40 Support part
41 Upper elastic support member (first elastic support member)
42 Lower elastic support member (second elastic support member)
50 Lens deforming part
51 Lens contact member
52 Coupling member
60 Cover
71 Liquid lens
72 Lens support member
M Smartphone
A Camera module

The invention claimed is:

1. A lens driving device that applies a force to the liquid lens to change a focal length and an optical axis of the liquid lens, the lens driving device comprising:
a fixed part;
a movable part disposed apart from the fixed part;
a first elastic support member and a second elastic support member that elastically connect the movable part and the fixed part to each other and supports the movable part with respect to the fixed part;
a driving part including a voice coil motor that includes a coil and a magnet, the driving part being for moving the movable part with respect to the fixed part in a direction of the optical axis; and
a lens deforming part connected to the movable part, the lens deforming part being for applying a force to the liquid lens in the direction of the optical axis in accordance with a movement of the movable part, wherein:
the movable part includes a plurality of movable units,
the coil is disposed in each of the plurality of movable units,
the magnet is disposed at each of positions in the fixed part, the positions corresponding to the plurality of movable units,
the plurality of movable units each includes a control Integrated Circuit (IC) that controls energization of the coil,
the first elastic support member is electrically connected to a wiring disposed at the fixed part and a power supply terminal of the control IC, and connects the power supply terminals in adjacent movable units of the plurality of movable units to each other,
the second elastic support member is electrically connected to a wiring disposed at the fixed part and a signal terminal of the control IC, and connects the signal terminals in the adjacent movable units to each other, and
the driving part drives the plurality of movable units independently in such a way that a curvature of the liquid lens changes or the optical axis of the liquid lens changes.

2. The lens driving device according to claim 1, wherein:
the elastic support member is electrically connected to the wiring by a jumper wire extending from the fixed part toward a light receiving side in the direction of the optical axis.

3. A camera module, comprising:
the lens driving device according to claim 1;
the lens unit; and
an image capturing part that captures a subject image formed by the lens unit.

4. A camera-mounted device that is an information device or a transporting device, the camera-mounted device comprising:
the camera module according to claim 3; and
an image processing part that processes image information obtained by the camera module.

* * * * *